United States Patent Office 2,941,971
Patented June 21, 1960

2,941,971
PROCESS FOR PREPARING STABLE EMULSIFIER-FREE ALKALI METAL-FREE LATICES OF VINYLIDENE MONOMERS

George E. Thompson, Cuyahoga Falls, and Gino P. Ferrini, Ravenna, Ohio, assignors to The B. F. Goodrich Company, New York, N.Y., a corporation of New York No Drawing. Filed Sept. 28, 1956, Ser. No. 612,590

6 Claims. (Cl. 260—29.7)

This invention relates to improvements in the production of stable, emulsifier-free latices of polymerized monomeric materials, which latices are also substantially free of alkali metal ions.

It has been an objective of those skilled in the art for many years to prepare latices of polymerized monomers which did not contain soaps and similar emulsifiers. The literature contains reference to emulsifier-free synthetic elastomer latices but none of these have been produced on a large production scale. Copending application, Serial No. 519,262, filed June 30, 1955, now United States Patent No. 2,847,404, issued August 12, 1958, discloses that stable synthetic polymer latices which are emulsifier free and also free of alkali metal ions may be prepared by polymerizing a monomer or mixture of monomers such as those containing butadiene-1,3, at least one of which monomers is partly soluble in water, in the presence of ammonium persulfate and sulfur dioxide and in the absence of emulsifiers. In small scale equipment, emulsifier-free and alkali metal ion-free latices have been prepared following this technique. However, when attempts were made to transfer this system to large scale reactors, many difficulties were encountered. Among these difficulties were long reaction times as high as 60 to 70 hours, the formation of latices with poor mechanical stability and resultant formation of coagulum in the polymerization reactors and low total solid latices which contained a wide range of polymer particle size.

It has now been discovered that stable emulsifier-free and alkali metal ion-free synthetic polymer latices which have relatively uniform large particle size and high total solids content may be prepared in large reactors, 1600 to 3750 gallons for example, in reasonable reaction times. The process required to obtain such latices on a production scale in either batch or continuous operations is a critical process and a number of necessary features must be observed. Essentially the improved process of this invention comprises polymerizing the desired monomers in water in the absence of emulsifiers and alkali metal ions in the presence of ammonium persulfate and sulfur dioxide at a temperature from about 10 to 30° C., and with proper agitation, at least ½ of the sulfur dioxide being added during the course of the polymerization reaction while gradually raising to the temperature of the polymerization mixture to about 40 to 50° C. during the course of the reaction as will be specified more fully hereinafter. The resulting latices are essentially free of coagulum, are stable to mechanical forces, may be readily concentrated, and being free of emulsifier and alkali metal ion, have many valuable uses in the latex art. The improved process of this invention is particularly applicable to preparation of latices of synthetic elastomer from monomer mixtures containing conjugated dienes such as butadiene-1,3.

The process of this invention is applied to monomers and monomer mixtures containing at least one monomer soluble to some extent in water at temperatures from about 10 to 50° C. Preferably, of the total amount of monomers used in any one aqueous polymerization recipe there should be dissolved in the water greater than about 0.5% of monomers at 25° C., and preferably about 1%. For example, acrylonitrile is soluble in water at room temperature to the extent of about 7.2% so that monomer mixtures containing acrylonitrile as a component can contain as small an amount as above 7% acrylonitrile, and preferably about 15% acrylonitrile, even if none of the other monomers are water-soluble. Thus, when polymerizing by the process of this invention, a monomer mixture containing butadiene, styrene and acrylonitrile, it is preferred that the mixture contain at least about 10% acrylonitrile. Ethyl acrylate has a water solubility of about 1.5% and thus may be used alone or in admixture with other water-insoluble monomers if at least about one-third of the monomer mixture is ethyl acrylate. A mixture of 80 parts butadiene-1,3, 6 parts acrylonitrile and 15 parts of ethyl acrylate, for example, is a useful mixture of which about 0.68 part (0.68%) is soluble in water. Other useful water-soluble monomers include, for example, methyl acrylate, about 5%; methyl methacrylate, about 1.5%; vinyl acetate, about 2.4%; methacrylonitrile, about 2.7%; acrylic acid, methacrylic acid and acrylamide which are quite soluble in water; methacrylamide; methyl vinyl ether, about 1.5%, ethyl vinyl ether, about 0.9%, vinyl-2-methoxyethyl ether, about 8.8%; methyl vinyl ketone, all proportions, ethyl vinyl ketone, about 3%, methyl isopropenyl ketone, about 5%; acrolein; and the like.

The method of the invention is further applicable generally to the polymerization of the defined monomer mixtures of unsaturated compounds containing the $H_2C=C<$ group, that is, vinylidene compounds which are compounds containing a terminal methylene group attached by a double bond to a carbon atom. Examples of such compounds include vinylidene compounds containing only one carbon-to-carbon unsaturated bond such as vinyl chloride; vinyl acetate; vinylidene chloride; vinyl fluoride; dichlorodifluoroethylene; vinyl acetate; the styrenes and polymerizable styrene derivatives including alpha-substituted styrenes such as alpha-methyl styrene, nuclear substituted styrenes such as vinyl toluene, the chlorostyrenes, alkoxystyrenes such as p-methoxystyrene and the like; acrylonitrile, methacrylonitrile and chloroacrylonitrile; acrylic and methacrylic acids, the alkyl acrylates and methacrylates; the alkyl vinyl ethers and alkyl vinyl ketones; the acrylamides; vinyl pyridine; vinyl benzoate and other similar monoolefinic compounds polymerizable by a free radical mechanism in aqueous systems. Other vinylidene compounds containing more than one unsaturated linkage include the conjugated dienes such as butadiene-1,3, isoprene, dimethyl butadiene and the like as well as myrcene; and compounds containing olefinic and acetylenic bonds such as vinyl acetylene, vinyl diethenyl carbonyl and the like. It will be understood that the vinyl compounds are a species of vinylidene compounds since they contain characteristic $$CH_2=\overset{|}{C}H$$

groups, one of the valences being connected to H to form vinyl groups.

Preferred in the practice of this invention are monomer mixtures containing a conjugated diene such as butadiene-1,3 or isoprene and one or more vinyl compounds, at least one of which is partly water-soluble. These monomer mixtures result ordinarily in latices containing polymerized products which will deposit elastic films. For example, monomer mixtures containing greater than 30% of butadiene, such as 50% butadiene-1,3, at least one of acrylonitrile or methacrylonitrile, and methyl or ethyl acrylate and like monomers of the required degree of water-solubility; and one or more other alkyl acrylates, polymerizable olefinically unsaturated acids such as acrylic, methacrylic, sorbic and the like; alkyl methacrylates, styrene and polymerizable styrene derivatives such as are described in A.C.S. Monograph No. 115, "Styrene" including alpha-methyl styrene, vinyl toluene, the chloro- and alkoxy-styrenes and like monoalkenyl aromatic compounds; vinyl pyridine, vinylidene chloride and the like, are employed to make latices particularly valuable in applications to leather, paper, fabrics, glass and the like, in dip applications etc.

The catalyst or initiator employed in this invention is ammonium persulfate together with sulfur dioxide. An amount of each from about 0.5 to about 3.0 weight parts per 100 weight parts of monomer are ordinarily employed. Preferably the amount may be varied from about 1 to about 2 weight parts each of sulfur dioxide and ammonium persulfate. It is essential to the obtainment of the desired results on a production scale to proportion sulfur dioxide into the polymerization during the course of the reaction. While there may be some variation in the times and amounts of sulfur dioxide addition, such additions should be substantially equivalent to adding more than one portion of sulfur dioxide in amounts from about 0.1 to about 0.75 weight parts, to a total amount of about 1 to 2 weight parts total, after an initial addition at the beginning of the polymerization reaction, which addition may be varied from about 0.1 to about 1.0 weight parts. As a useful guide for polymerization reaction which are begun at temperatures of about 20° C. for monomer mixtures containing butadiene-1,3 and acrylonitrile, sulfur dioxide additions are made substantially equivalent to 0.5 parts at one hour after the polymerization mixture is at 20° C., 0.5 part at about 5 hours and additional additions of about 0.2 part at about 10, 12 and 16 hours. Another modification is to add 0.2 part at 10 hours and about 0.4 part at about 20 hours. Ordinarily the sulfur dioxide is not charged initially to the reaction mixture until the mixture has reached the desired initial temperature. The first additional sulfur dioxide addition is then made when the monomer mixture has reached a conversion of between about 5 and about 30%, more preferably about 15 to 25%. In normal production runs at 20° C. this first addition is made at about 5 to about 20, more preferably about 10 to 15 hours after the polymerization has started. Additional amounts of sulfur dioxide are then added in about 2 to 4 portions at about 8 to 10 hours, at about 12 to 14 hours, and at about 15 to 17 hours. It is often found useful to add, at about 25 to 50% conversion, about 0.1 to about 0.5 weight parts of additional ammonium persulfate to maintain a reasonable reaction rate. It will be understood by those skilled in the art that the times and amounts of addition of sulfur dioxide may be varied with some reason and one still will obtain the desired stable end product.

The sulfur dioxide may be continuously proportioned into the polymerization mixture in order to approximate the total time additions described above. The sulfur dioxide is introduced into the polymerization mixture through a dip tube or charging line which is several feet below the latex level in the polymerizer. When the sulfur dioxide is introduced through the usual charging lines into the open spaces above the polymerization mixture, difficulty is experienced with the formation of large amounts of coagulum in the reactor. At the final temperature adjustment, which is described below, both sulfur dioxide, ammonium persulfate and a small amount of ferrous ammonium sulfate (0.001 to 0.003 weight parts) may be added. Additional amounts of sulfur dioxide beyond that required for the polymerization reaction may be added after the polymerization mixture has reached greater than about 50% conversion to provide a more stable product, in amounts as high as about 1 weight part or more. The examples which follow will demonstrate some of the variation allowable while still obtaining the desired product.

The other critical feature of this invention which must be observed in order to obtain latices of synthetic polymers of the desired stability, uniform average particle size, solids content and reasonable reaction time is an increase in polymerization temperature during the course of the polymerization reaction. It is essential that the polymerization be begun at a temperature substantially below that at which it is completed. These increment increases should be substantially equivalent to those disclosed below. Ordinarily the polymerization reaction should be begun at a temperature between about 10 and 30° C., more preferably between about 15 and 25° C. A preferred initial temperature is 20° C. The temperature of the polymerization mixture is gradually increased during the course of the reaction ordinarily beginning at a conversion of about 1 to 5%, to reach a temperature of about 45 to 50° C. at about 50 to 60% conversion to maintain a sustained reaction rate. At a temperature of about 20° C. one should obtain a rate of conversion of monomers to polymer of about 1% to about 3% per hour. At a conversion of about 3% to about 10%, preferably about 5%, the temperature may be raised about 10 to 20° C., preferably an average of about 15° C. This adjustment ordinarily will occur at about 2 to 4 hours when the initial polymerization temperature is about 20° C. after the charge is at 20° C. A useful series of adjustments are (1) initial temperature 20° C.; adjustment to 30° C. at about 2 to 3 hours; to 40° C., at about 6 to 7 hours; and 45° C. at 15 hours; or (2) to 30° C. at 2 hours, to 40° C. at 6 hours, to 45° C. at 15 hours and to 50° C. at 20 hours; or (3) to 35° C. at 2 hours, to 45° C. at 5 hours and to 50° C. at 15 hours; and the like. Better results are ordinarily obtained when the polymerization is begun at 20° C. with at least two temperature adjustments during the course of the polymerization reaction prior to about 50% conversion and the polymerization is concluded at temperatures below about 50° C.

At the end of the reaction the temperature may be briefly raised to 65° if desired. It will be understood that the standard large scale polymerizers ordinarily used do not have efficient heat transfer systems so that there can be some mechanical variation in making the adjustments described above. It is also contemplated that with more efficient systems and good heat transfer, the temperature of the polymerization may be gradually and continuously increased from the initial reaction temperature to the desired maximum temperature so long as such adjustment is substantially equivalent to the increment adjustments described above.

The type of agitation employed in preparing the stable latices of this invention, while it may be varied, should be controlled as will be understood and is within the knowledge of those skilled in the art. Agitation sufficient to obtain efficient mixing and heat transfer which is less than excessive agitation which causes formation of coagulation is required. It is believed that agitation of a type which results in pumping as opposed to shearing is desired. Best results ordinarily are not obtained through the use of radial type agitation. Better results are obtained when the agitation is substantially equivalent to that described below. In a 1600 gallon reactor which is 66 inches in diameter and 123 inches high, equipped with an off-center agitator equipped with two Marine impellers 18 inches in diameter, located 45 and 75 inches from the bottom of the reactor on the impeller shaft, the range of speeds of agitaiton is from about 190 r.p.m. to about 265 r.p.m. when containing about 10,000 pounds of charge. The agitation rate for 20 inch Marine impellers similarly located is about 170 r.p.m. to about 240 r.p.m. In a 3750 gallon reactor, 90 inches in diameter and 160 inches high, equipped with a center located Marine impeller having two 30 inch blades, the agitation range is from about 150 r.p.m. to about 220 r.p.m. For two 36 inch Marine impellers this range would be about 130 r.p.m. to 180 r.p.m. In preferred production reactors, a bundle of cooling coils (ordinarily 8 banks) projects downwardly into the reactor from the top of the reactor. If such cooling coils are not employed, at least one and preferably 1 to 4 baffles, usually 1/12 the diameter of the reactor in size, placed in opposed position on the sides of the reactor are employed.

If it is desired to increase the rate of reaction at a given temperature or to cause polymerization to take place at a normal rate at lower temperatures, a trace of a group VIII metal ion, preferably iron, in the form of water-soluble salt, or less desirably, in the form of a less soluble salt which is soluble to the extent to maintain the required concentration of metal ions, may be added to the polymerization mixture initially or during the course of the polymerizations. For most latex applications the presence of a trace of these metal ions can be tolerated and in such instances it is preferable to employ from about $1 \times 10^{-4}$ to about $10 \times 10^{-4}$ weight parts of iron ions derived from a water-soluble ferrous or ferric salt, as can be determined by referring to a Chemistry Handbook, per 100 weight parts of monomers. More preferably an amount of ferrous ion is employed from about $4 \times 10^{-4}$ to about $8 \times 10^{-4}$ parts. Iron acetates, halides, sulfates, nitrates and the like are soluble in water and are quite suitable. It is essential to obtain the valuable latices of this invention that alkali metal ions be rigorously excluded.

The amount of ferrous ion employed in the form of ferrous ammonium sulfate is preferably from about 0.001 to 0.005 weight parts charged initially and an amount from about 0.001 to 0.005 added to the polymerization mixture usually at the time of the final temperature adjustment. Other lesser additions of ferrous ion may be added during the course of the polymerization reaction as described above after the monomer mixture has reached a conversion of about 10 to 20%.

A preferred basic initial recipe for the preparation of a large variety of emulsifier-free alkali metal ion-free latices at an initial reaction temperature of 10 to 30° C., adjusted to 40 to 50° C. is as follows:

Materials: Weight parts
- Monomers _____ 100.0
- Water _____ 100–200
- Ammonium persulfate _____ 1.0±0.5
- Sulfur dioxide _____ 1.5±0.5
- Ferrous ions _____ $4-8 \times 10^{-4}$ Sulfur dioxide, ammonium persulfate and ferrous ammonium sulfate are added as described above. It is generally desirable for monomer mixtures containing butadiene-1,3 to also include from about 0.1 to about 1.5 or 3.0 parts of a mercaptan modifier. Less than about 2 parts of mercaptan modifiers containing about 3 to 18 carbon atoms may be employed with better results being obtained from those containing about 8 to 16 carbon atoms. The most useful mercaptans are the tertiary $C_{12}$ mercaptans. The concentration of water in the recipe may be varied from about 100 to about 200 parts depending upon the final total solids content desired in the latices. Use of this recipe results in stable, valuable, useful latices including, for example, latices of monomer mixtures of vinyl chloride and ethyl acrylate, styrene and acrylonitrile, styrene and ethyl acrylate, vinyl chloride and vinyl acetate, vinylidene chloride and acrylonitrile butadiene-1,3 monomer mixtures, and the like.

The degree of polymerization may be varied as desired but ordinarily is from about 60% to complete conversion of monomers to polymer. The latices of the invention may be concentrated to total solids greater than that obtained from the polymerization, and to an even greater degree than normal if a small amount of a non-ionic surface-active agent is added thereto, less than about one part, by means of the usual latex concentrating methods. Of course, surface-active agents may be added to the latex prepared by the novel process of this invention if desired. Although the examples given herein are batch polymerizations, the processes of this invention are particularly applicable to continuous systems.

Example I

The following recipe is employed in making a stable emulsifier-free latex in a 1600 gallon reactor:

| Materials | Parts | Pounds |
|---|---|---|
| Soft Water | 145.00 | 6,010 |
| Butadiene | 66.70 | 2,815 |
| Acrylonitrile | 33.30 | 1,380 |
| Ammonium Persulfate | 1.00 | 41.5 |
| Tertiary $C_{12}$ mercaptan | 0.45 | 18.65 |
| Ferrous Ammonium Sulfate . $6H_2O$ | 0.0032 | 0.133 |
| (Addition During Polymerization) Sulfur Dioxide | 1.65 | 68.4 |

A 1600 gallon polymerization reactor which is 66 inches in diameter and 123 inches high containing 6 banks of internal cooling coils is prepared for charging by cleaning, flushing with water and pressure testing. 637 gallons of soft water are charged to the reactor. 1380 pounds of acrylonitrile mixed with 18.65 pounds of a tertiary $C_{12}$ mercaptan are then charged to the reactor. The reactor is then evacuated and 539 gallons (2815 pounds) of butadiene-1,3 are charged to the reactor. The agitator which is an off-center double Marine agitator having 18 inch diameter impellers located 45 and 75 inches from the bottom of the reactor, is turned on at 210 to 220 r.p.m. The temperature of the polymerization mixture is adjusted to 20° C. When the polymerization mixture is at 20° C. a solution of 41.5 pounds of ammonium persulfate and 70 pounds of water are added thereto and immediately thereafter 60.3 grams of ferrous ammonium sulfate dissolved in 2 pounds of water are added to the polymerization mixture. One hour after the addition of ferrous ammonium sulfate 20.75 pounds of sulfur dioxide are added to the polymerization mixture at an approximate rate of 0.5 pound per minute. One hour after the sulfur dioxide is added the temperature of the polymerization mixture is adjusted to 30° C. One hour after the temperature reaches 30° C., 20.75 pounds of sulfur dioxide are added to the polymerization mixture. One hour after this second sulfur dioxide addition the temperature of the polymerization mixture is raised to 40° C. At 10 and 12 hours, respectively, 9 pounds of sulfur dioxide are added to the polymerization mixture. At 15 hours the temperature of the polymerization batch is adjusted to 45° C. At 16 hours, 9 pounds of sulfur dioxide are added to the polymerization batch. At about 90% conversion of monomers to polymer, 25 pounds of ammonium hydroxide are added to the mixture and cooling water is turned on the reactor. About 10 pounds of butylated hydroquinone in alcohol solution is then added to the polymerization mixture to shortstop the reaction. The excess monomers are vented, vacuum is applied to the charge for several hours and the desired rubber antioxidant is added thereto. The resulting latex is a stable material having a uniform particle size and a total solids content of 36% which may be readily concentrated to about 45% total solids. The total elapsed reaction time is about 22 hours. The reaction temperature is 20° C. initially, 30° C. at the first sulfur dioxide addition, 40° C. after second sulfur dioxide addition and 45° C. at 15 hours.

Example II

The following recipe is employed to make another type of stable emulsifier-free latex by the procedure of Example I.

Materials: Parts
- Butadiene _____ 67.0
- Acrylonitrile _____ 30.0
- Methacrylic acid _____ 3.0
- Ammonium persulfate _____ 1.0
- Ferrous ammonium sulfate _____ 0.0042
- Tertiary dodecyl mercaptan _____ 0.2 to 0.4
- Water _____ 160.0
- Sulfur dioxide _____ 1.65

The sulfur dioxide is added as follows: 0.5 part in one hour, 0.5 part in 4 hours, 0.22 part at 10, 12 and 16 hours after the polymerization charge has been brought to temperature. The reaction is initiated at 20° C. followed by temperature increases as follows: at 2 hours to 35° C., at 5 hours to 45° C., and at 15 hours to 50° C. A conversion of about 90% is reached in about 32 to 34 hours. The total solids content with latex products is about 35%. An extremely stable latex is obtained with no coagulum forming during the course of the polymerization. The agitation employed is a double marine type at 325 r.p.m. This agitation in 175 gallon reactor is substantially equivalent to 210 r.p.m. of the defined agitator in the 1600 gallon reactor. A single marine agitator is unsatisfactory. A double 6 bladed flat turbine agitator at 170 r.p.m. in 175 gallon reactor also provides satisfactory agitation.

*Example III*

Another charge is made employing the recipe of Example I and the general procedure described therein with the following modifications. At 1 hour and 5 hours after the polymerization mixture is at 20° C., 0.5 part of sulfur dioxide are added, and at 10, 12 and 15 hours, 0.22 part of sulfur dioxide are added. Temperature changes are made at 2.5 hours to 30° C., 6 hours to 40° C., and at 15 hours to 45° C. This latex has a total solids of about 37%, reached 89% conversion in about 22 hours and is quite stable. The viscosity of the latex is 12.5 and the surface tension in dynes/cm. is 58 in this reactor charge. Only a small amount of coagulum was found in the reactor at the end of the charge.

*Example IV*

The following polymerization recipe may be used in a 1600 gallon reactor:

Materials: Parts
- Water _____ 180
- Butadiene _____ 67.0
- Acrylonitrile _____ 33.0
- Tertiary $C_{12}$ mercaptan _____ 0.6
- Ammonium persulfate (initial) _____ 0.9
- Ferrous ammonium sulfate (initial) _____ 0.0042
- Sulfur dioxide (initial) _____ 0.6

In this recipe 0.6 part of sulfur dioxide are charged as soon as the polymerization mixture is at 20° C. The following additions of sulfur dioxide are then made as folows: 0.3 part in 4 hours, 0.3 part at 6 hours, 0.15 part at 8 hours, 0.15 part at 10 hours, 0.15 part at 15 hours. 0.0021 part of ferrous ammonium sulfate and 0.30 part of ammonium persulfate are added dissolved in water at 6 hours. The temperature adjustment are to 35° at 3 hours and 45° at 5 hours. The conversion in this case is 92% at 21.5 hours and the average particle size of the latex is about 1600 angstroms. A similar charge requiring about 30 hours reaction time has an average particle size of about 1900 angstroms. The particle size range is quite narrow. In the case of this charge, the conversion in one hour is 4%, at 5 hours 15% and at 10 hours 48%. After the charge is removed from the reactor the reactor is found to be quite clean. The stable latex of this polymerization can be readily concentrated in a heat exchanger type concentrator to a total solids content of about 50%.

When Example IV is repeated with a monomer mixture containing about 35% butadiene-1,3, about 30% acrylonitrile and about 35% styrene, a stable latex containing particles about 2400 angstrom average size is obtained.

It will be apparent to those skilled in the art that stable, emulsifier-free, alkali metal ion-free polymer latices may be prepared which have useful total solids content, polymer particles of relatively uniform and large particle size in the range between about 1000 and 3000 angstroms, at reasonable reaction rates in large scale equipment when the several features of this invention are observed. Ammonium persulfate and sulfur dioxide must be employed and the sulfur dioxide must be added gradually during the course of the polymerization reaction. In addition, the polymerization reaction must be started at a low temperature and gradually raised to a higher temperature within the ranges set forth hereinabove. While there may be some variation in the relation of these various factors, so long as they are generally observed in the relations described, the defined, improvement of this invention is obtained.

When the above-described techniques and procedures are applied to the other monomers and monomer mixtures listed above, similar successful polymerizations and valuable stable emulsifier-free latices are obtained.

We claim:

1. In the process for preparing a stable synthetic rubber latex free of emulsifiers and of alkali metal ions by the polymerization in water of synthetic rubber producing monomeric material composed entirely of a conjugated diene and at least one vinyl monomer, at least one of which is soluble in the water to the extent of at least 0.5% by weight at temperatures from about 10 to 50° C., in the presence of ammonium persulfate and sulfur dioxide and in the absence of emulsifiers and alkali metal ions, the improvement, designed for use on a plant scale to avoid substantial formation of coagulum in the latex, which consists of the steps of (a) charging a polymerization reactor with water, said monomeric material, ammonium persulfate and sulfur dioxide (b) subjecting the contents of the reactor to polymerizing conditions, including agitation without producing substantial shearing action and maintenance of a temperature in the range of 10 to 30° C., to produce a conversion of monomer to polymer at a rate of about 1 to 3% per hour and maintaining said polymerizing conditions until about 3 to 10% of total monomer is converted to polymer and (c) thereafter raising the temperature of the contents of the reactor by at least about 10° C. but to a temperature no higher than about 50° C. and adding to the reactor additional quantities of sulfur dioxide while maintaining polymerizing conditions until 60 to 100% of the total monomer is converted to polymer, the relative proportions of materials used in steps (a), (b) and (c) being as follows:

| | Parts by weight |
|---|---|
| Monomeric material | 100 |
| Water | 100 to 200 |
| Ammonium persulfate | 0.5 to 3 |
| Sulfur dioxide, of which at least 50% but not more than 2 parts is added in step (c) | 0.5 to 3 |

2. In the process for preparing a stable synthetic rubber latex free of emulsifiers and of alkali metal ions by the polymerization in water of synthetic rubber producing monomeric material composed entirely of a mixture of butadiene with a vinyl monomer which is soluble in the water to the extent of at least 0.5% by weight at temperatures from about 10 to 50° C., said vinyl monomer being selected from the class consisting of styrene, acrylonitrile, ethyl acrylate, acrylic acid and methacrylic acid, in the presence of ammonium persulfate, sulfur dioxide and ferrous ions, and in the absence of emulsifiers and alkali metal ions, the improvement, designed for use on a plant scale to produce in a total polymerization time substantially less than 60 hours such a latex having particles in the range of about 1000 to 3000 angstrom units in size, and without the formation of substantial amount of coagulum, which consists of the steps of (a) charging a polymerization reactor with water, said monomeric material, ammonium persulfate, sulfur dioxide and a water-soluble ferrous iron salt, (b) subjecting the contents of the reactor to polymerizing conditions including agitation without producing substantial shearing action and maintenance of a temperature in the range of about 10 to 30° C. to produce a conversion of monomer to polymer at a rate of about 1 to 3% per hour and maintaining said polymerizing conditions until about 3 to 10% of total monomer is converted to polymer and (c) thereafter raising the temperature of the contents of the reaction by at least about 10° C. but to a temperature no higher than about 50° C. and adding to the reactor additional quantities of sulfur dioxide while maintaining polymerizing conditions until 60 to 100% of the total monomer is converted to polymer, the relative proportions of materials used in steps (a), (b) and (c) being as follows:

| | Parts by weight |
|---|---|
| Monomeric material | 100 |
| Water | 100 to 200 |
| Ammonium persulfate | 0.5 to 3 |
| Ferrous ions | $1 \times 10^{-4}$ to $10 \times 10^{-4}$ |
| Sulfur dioxide, of which at least 50% but not more than about 2 parts is added in step (c) | 0.5 to 3 |

3. The improvement of claim 2 wherein the monomeric material contains butadiene and acrylonitrile, butadiene constituting at least 30% by weight of the monomeric material and acrylonitrile at least 10% by weight of the monomeric material.

4. The improvement of claim 2 wherein the monomeric material is composed of about 67% butadiene and about 33% acrylonitrile.

5. The improvement of claim 2 wherein the monomeric material is composed of about 67% butadiene, about 30% acrylonitrile and about 3% methacrylic acid.

6. The improvement of claim 2 wherein the monomeric material is composed of about 35% butadiene, about 30% acrylonitrile and about 35% styrene.

References Cited in the file of this patent

UNITED STATES PATENTS

| | | |
|---|---|---|
| 2,097,263 | Strain | Oct. 26, 1937 |
| 2,137,393 | Dorough et al. | Nov. 22, 1938 |
| 2,270,024 | Renfrew et al. | Jan. 13, 1942 |
| 2,296,403 | Renfrew | Sept. 22, 1942 |
| 2,383,055 | Fryling | Aug. 21, 1945 |
| 2,462,354 | Brubaker et al. | Feb. 22, 1949 |
| 2,498,226 | Sully | Feb. 21, 1950 |
| 2,778,812 | Dreisbach et al. | Jan. 22, 1957 |
| 2,847,404 | Hoertz | Aug. 12, 1958 |

OTHER REFERENCES

Willis: "Industrial and Engineering Chemistry," volume 41, No. 10, pages 2272–2276, October 1949.

Whitby et al.: "Journal of Polymer Science," volume XVI, pages 549–576, April 1955.